(12) United States Patent
Hwang et al.

(10) Patent No.: US 6,648,824 B2
(45) Date of Patent: Nov. 18, 2003

(54) ULTRASOUND IMAGING SYSTEM FOR PERFORMING RECEIVING FOCUSING AT POINTS CORRESPONDING TO DISPLAY PIXELS AND METHOD THEREOF

(75) Inventors: Jae Sub Hwang, Seoul (KR); Tai Kyong Song, Seoul (KR)

(73) Assignee: Medison Co., LTD, Kangwon-Do (KR)

( * ) Notice: Subject to any disclaimer, the term of this patent is extended or adjusted under 35 U.S.C. 154(b) by 114 days.

(21) Appl. No.: 09/785,968

(22) Filed: Feb. 16, 2001

(65) Prior Publication Data

US 2001/0020129 A1 Sep. 6, 2001

(30) Foreign Application Priority Data

Feb. 16, 2000 (KR) .......................................... 2000-7236

(51) Int. Cl.⁷ .................................................. A61B 8/00
(52) U.S. Cl. ...................... 600/437; 600/443; 600/437; 367/11; 367/7
(58) Field of Search .................. 600/443, 437, 600/447; 367/11, 7; 342/185

(56) References Cited

U.S. PATENT DOCUMENTS 5,197,037 A * 3/1993 Leavitt ........................ 367/11
5,235,982 A * 8/1993 O'Donnell .................. 600/443
5,390,674 A * 2/1995 Robinson et al. ........... 600/443

FOREIGN PATENT DOCUMENTS

KR          93-947          1/1993

* cited by examiner

Primary Examiner—Marvin M. Lateef
Assistant Examiner—Ruby Jain
(74) Attorney, Agent, or Firm—Thelen Reid & Priest LLP; David B. Ritchie (57) ABSTRACT

All RF data received by transducers in response to an ultrasonic signal that was transmit-focused on a point along a predetermined scan lines are stored to compute display data for those points of an object that do not necessarily correspond to the pixels of the screen of a display device. For the determination of display data for each pixel point, reflected ultrasonic signals from multiple points around the point of interest are found and used to detect the peak of a waveform constituted by the reflected ultrasonic signals. With this scheme, the distortion due to conventional interpolation used for a limited number of scan lines can be greatly reduced.

7 Claims, 11 Drawing Sheets

ULTRASOUND IMAGING SYSTEM FOR PERFORMING RECEIVING FOCUSING AT POINTS CORRESPONDING TO DISPLAY PIXELS AND METHOD THEREOF

FIELD OF THE INVENTION

The present invention relates to an imaging system and more particularly to an ultrasonic imaging system.

BACKGROUND OF THE INVENTION

Figure 1:
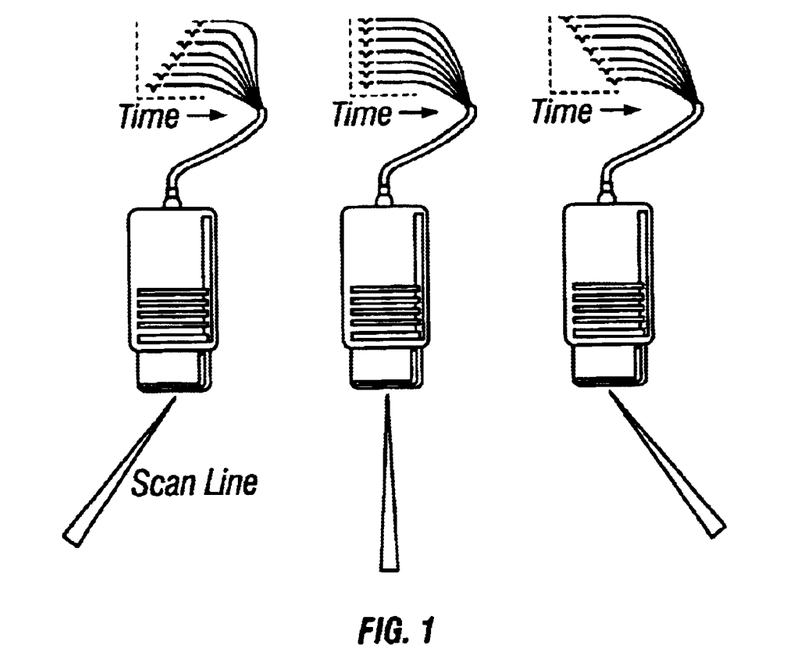
FIG. 1 shows a transducer array in three different delay modes.
Figure 2:
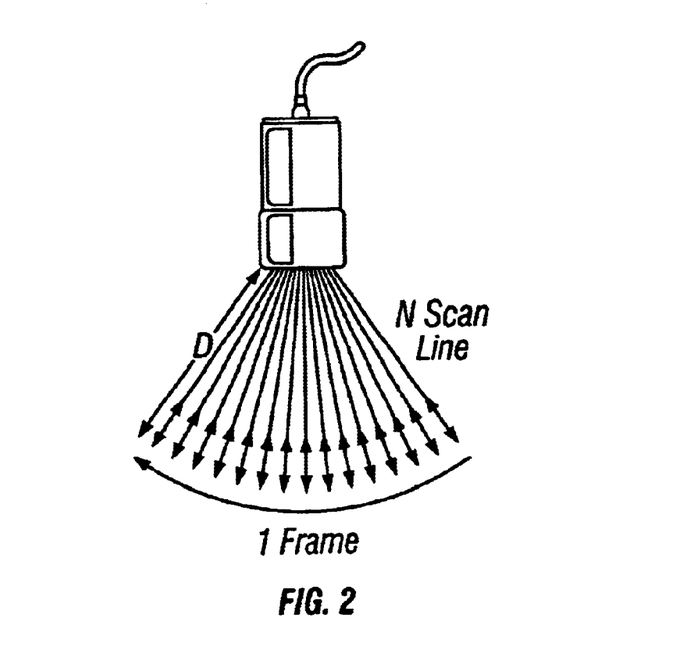
FIG. 2 shows a transducer array that sequentially focuses on a point on radial scan lines.
Figure 3:
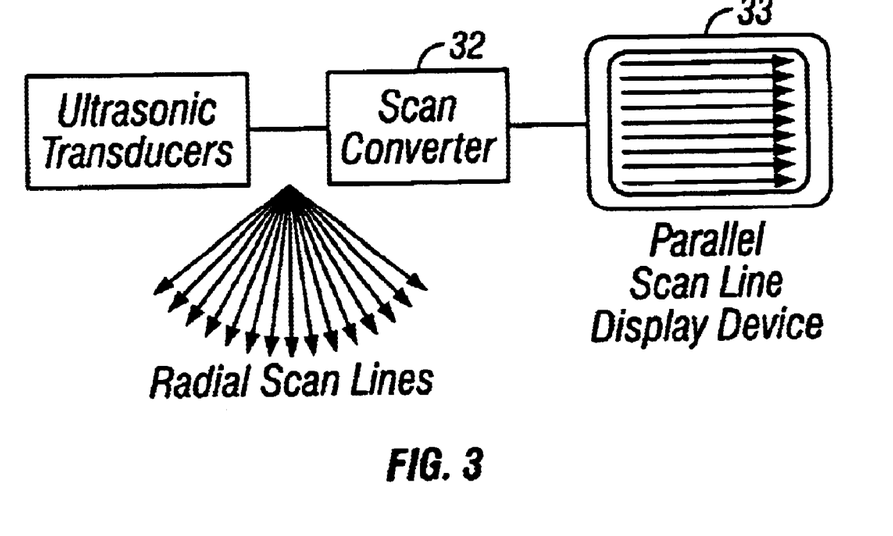
FIG. 3 is a block diagram illustrating the function of a scan converter that converts receive-focused signals from transducers to a display data.
Figure 4:
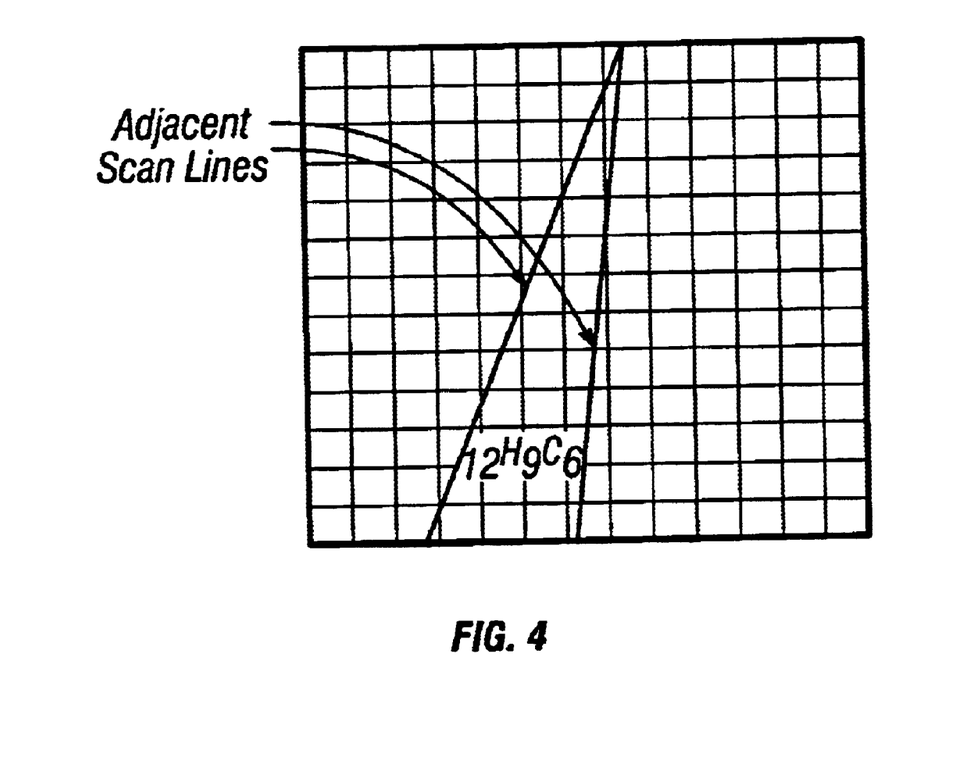
FIG. 4 shows pixel locations in a display device that are not on actual scan lines.

Ultrasonic imaging systems are widely used in the medical diagnostic field for their ability to obtain the image of an object non invasively, i.e., by transmitting ultrasound to the object and processing its reflection. Conventional ultrasonic imaging systems have an array of ultrasound transducers or probes for generating ultrasound and receiving the ultrasound reflected off an object. Ultrasonic pulses from the array of ultrasonic transducers are focused to a desired point by controlling the timing of ultrasonic pulse generation at each of the transducers. FIG. 1 allows the timing control or ultrasound generation at an array of transducers in order to compensate propagation delay due to different distances from the transducers to a particular point. By sequentially delaying generation of ultrasonic pulse signals from the transducers, all the ultrasonic pulses simultaneously reach a point. Simultaneous reception of the reflected ultrasound from a particular point at the array of transducers is also made possible by sequentially adjusting receive timings of the transducers, where the greater the distance from a transducer to the point is the more receive delay is provided to the transducer. In order to obtain an accurate image of an object, transmit focusing to various points on the object is needed. But after transmitting ultrasonic pulses to be focused on a selected point, transmission to another point has to wait until all the reflected ultrasonic signals are received including one reflected from the farthest point. Increasing the number of transmit focal points has a drawback because it would also increase the amount of time required to obtain an image, thereby reducing the frame rate. The frame rate in the case that each scan line transmits to focus on a single point is determined by the following equation.

$$1/FR = 2D/v \times N$$

wherein FR, D, v and N represent the frame rate, depth of scan, velocity of ultrasound transmission in the medium, and the number of scan lines respectively. As can be seen from the equation, the frame rate is inversely proportional to the number of scan lines, presenting one with a trade-off between the two variables. As a solution, a radial scan pattern to cover the whole area of diagnosis has been conventionally with ultrasound sequentially applied along N number of the scan lines to predetermined points. Beside the radial scan pattern as illustrated in FIG. 2, a parallel scan line pattern has also been widely used. With these scanning methods receive focusing is achieved only on the points along the scan lines, limiting collection of information on an object to the points of the scan lines. Display devices generally have pixels arranged in a matrix on their screens and each pixel should be provided with display data to form an image. FIG. 3 shows a scan converter 32, using the data collected with dynamic receive focusing, to generate display data for the pixels of a display device. The scan converter first stores data which are receive-focused from predetermined points on the scan lines and next converts it to a horizontal raster line display format used in most display devices. The information about a target object acquired by using the dynamic receive-focusing scheme is limited to focused points on the scan lines. These focused points do not necessarily coincide with actual pixel points of a display device that can represent the image of the target object (these actual pixel points corresponding to the pixel locations of the display device will simply be referred to as "pixel points" hereafter). Thus the scan converter has to perform interpolation to provide display data for all the pixels of the display device. For example, in the case of a radial scan pattern as shown in FIG. 4, because the distance between each pair of adjacent scan lines because greater as it is measured farther away from the transducers, the number of pixel points increases that do not have a one-to-one correspondence to points on the scan lines. As a result, display data for those pixel points can not be directly collected simply by the dynamic focusing. The scan converter determines display data for these pixels by interpolation using focused points on scan lines nearest to the pixels. Even in the case of parallel scan lines, some of the pixels in the display device may not correspond to those points on the scan lines. Thus a scan converter is still needed in a parallel scan-line ultrasonic imaging system.

Figure 5:
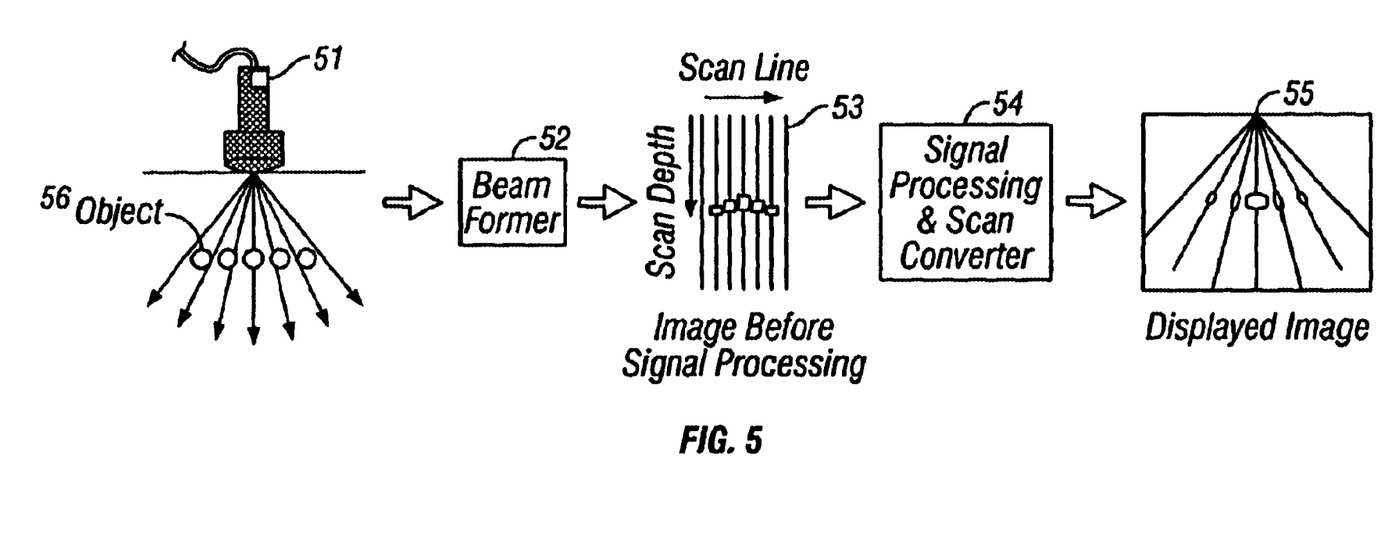
FIG. 5 is a block diagram of a conventional dynamic receive-focus ultrasonic image system.
Figure 6:
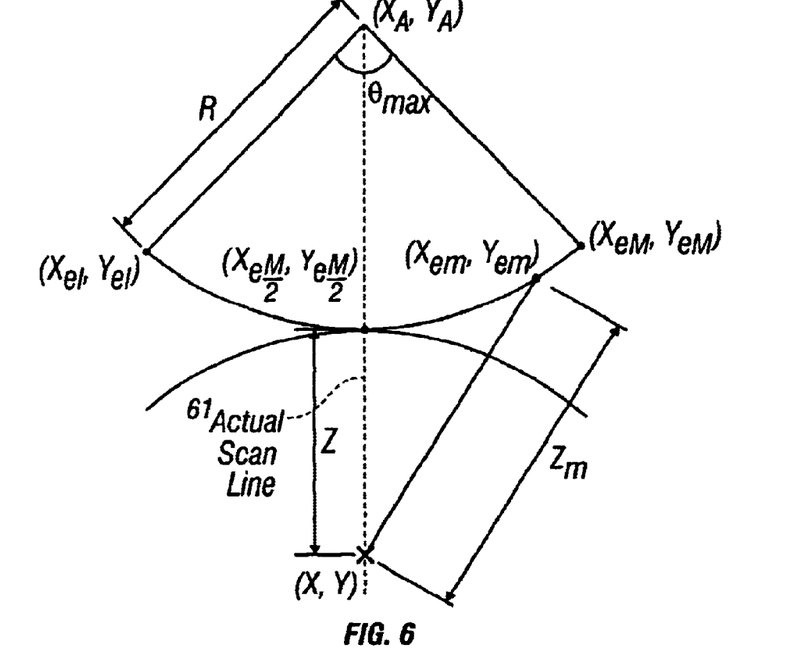
FIG. 6 illustrates propagation delay of receive-focus in a conventional ultrasonic image system.

FIG. 5 is a block diagram of an ultrasonic imaging system using a conventional dynamic receive focusing scheme. An array of transducers sequentially transmits ultrasound to be focused on desired points on the scan lines. After transmitting ultrasonic signals on a scan line, the transducers receive reflected ultrasonic signals and a beam-former focuses the received ultrasound from a plurality of points on the scan line. The function of the beam-forming part will be better understood by referring to FIG. 6. FIG. 6 describes computation of ultrasound propagation delay in the case of receive focusing and illustrates a case where M channels out of a total of M transducers are used for both transmission and reception, N channels being arranged in a curvilinear array with radius R(mm) and transmission angle $\theta_{max}$. When M channel/transducers disposed at the coordinates are used for receive focusing a point at distance Z on a scan line, the ultrasound propagation delay from the point (x, y) to an mth transducer is expressed as follows:

$$t_{dm} = t_{t,dm} + t_{v,dm} = \frac{Z}{v} + \frac{Z_m}{v}, Z_m = \sqrt{(x - x_{cm})^2 + (y - y_{cm})^2}$$

In order to discriminate a signal that was reflected from the point (x,y) from all the RF signals arriving at the mth transducer, a period of time from transmission to reception should be taken into account. In the above equation, the term $t_{t,dm}$ represents the time the ultrasound took from the start of transmission to reach the point and the term $t_{r,dm}$ represents the time the reflection took from the point (x,y) to the mth transducer. At the time of transmission, all the transducers are controlled to transmit respective ultrasonic signals such that they arrive simultaneously at a predetermined point. That the ultrasound travel times from each transducer to the point are the same may be assumed. By using the ultrasound propagation delay, each transducer reads the reflection signal it receives from the point and, by adding these reflection signals together, receive-focused data as to the point is obtained.

Referring back to FIG. 5, by repeating the receive-focus for a plurality of points along each scan line, an image of a target object can be obtained. These data are converted by a scan converter to appropriate values corresponding to pixels in a display device. The beam former (52) stores those data which are receive-focused at the points along the scan lines. In this process some of information in the reflection signals are lost. As shown in FIG. 4, because data associated with points between adjacent scan lines are not provided by the beam-former, the scan converter creates the image date, of these in-between points by interpolation using the image data of the adjacent scan lines. The interpolation, however, results in a distorted image. In order to reduce the distortion, the number of scan lines should be increased so that missing data between scan lines can be reduced but this presents a problem for an ultrasonic image system requiring real-time and high frame rate. Thus an ultrasonic image system which can prevent image distortion without increasing the number of scan lines has been needed.

SUMMARY OF THE INVENTION

A receive-focus scheme according to the present invention stores all RF date the transducers receive and directly receive-focuses at points corresponding to pixels by using the stored data. With this scheme, the distortion due to conventional interpolation used for a limited number of scan lines can be greatly reduced. The present invention is particularly useful in a high frame rate, high resolution system having a wide transmission angle or in a smaller system that can not afford expensive hardware such as a digital scan converter.

DETAILED DESCRIPTION OF THE INVENTION

Figure 7:
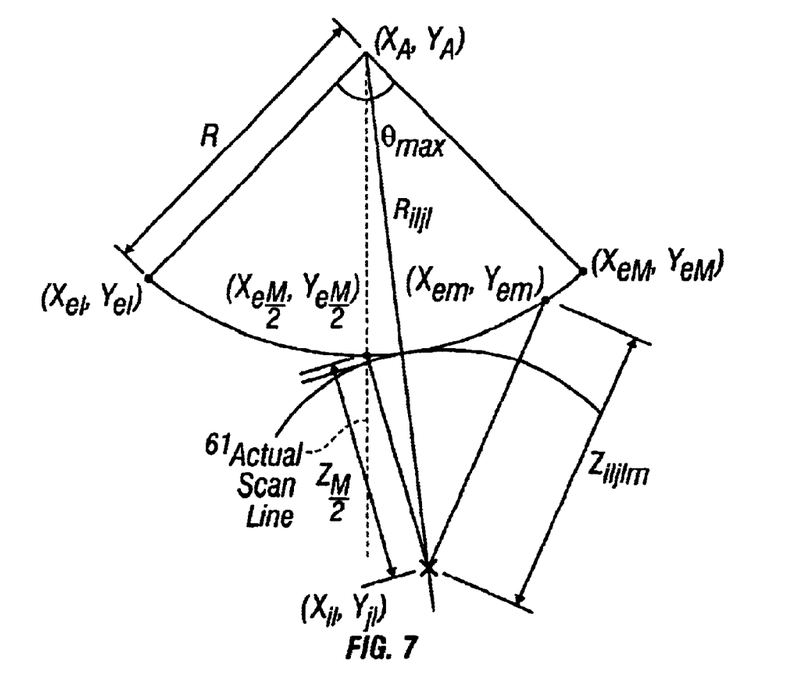
FIG. 7 illustrates propagation delay from a pixel point when received focused.

Pixel-based received focusing according to an embodiment of the present invention will be described referring to FIG. 7. FIG. 7 illustrates the calculation of propagation delay of ultrasound from a pixel point, a point of the target object that can be represented by the matrix of the display screen, as defined above, according to the present invention. As mentioned earlier, a pixel point is not necessarily located on the scan lines. The present invention is directed to receive-focusing ultrasound from all the pixel points as opposed to merely from scan line points. First the time it takes for ultrasound to propagate from an arbitrary point of $(x_{i1}, y_{j1})$, that does not necessarily correspond to a pixel point of a display screen, to an mth transducer at $(x_{em}, y_{em})$ is as follows.

$$t_{dm} = t_{i,dm} + t_{r,dm} = \frac{Z_{\frac{M}{2}}}{v} + \frac{Z_{iljlm}}{v},$$

$$Z_{\frac{M}{2}} = \sqrt{\left(x_{il} - x_{e\frac{M}{3}}\right)^2 + \left(y_{jl} - x_{e\frac{M}{2}}\right)^2},$$

$$Z_{iljlm} = \sqrt{(x_{il} - x_{em})^2 + (y_{il} - x_{em})^2}$$

, where $t_{t,dm}$ is the propagation time to a pixel point $(x_{i1}, y_{j1})$ and $t_{r,dm}$ is the propagation time from a pixel point $(x_{i1}, y_{j1})$ to an mth transducer. Once the propagation time from a predetermined pixel point is calculated by using the above equation, the ultrasonic signal reflected from the pixel point and received by the transducer is discriminated based on the calculated propagation time. After reflected ultrasonic signals from the same point and received by all other transducers are likewise discriminated using Equation 3, they are added together to produce the characteristics of reflected ultrasonic signal from that point. With this method, interpolation is not needed to generate display data for all the pixel points.

Figure 8:
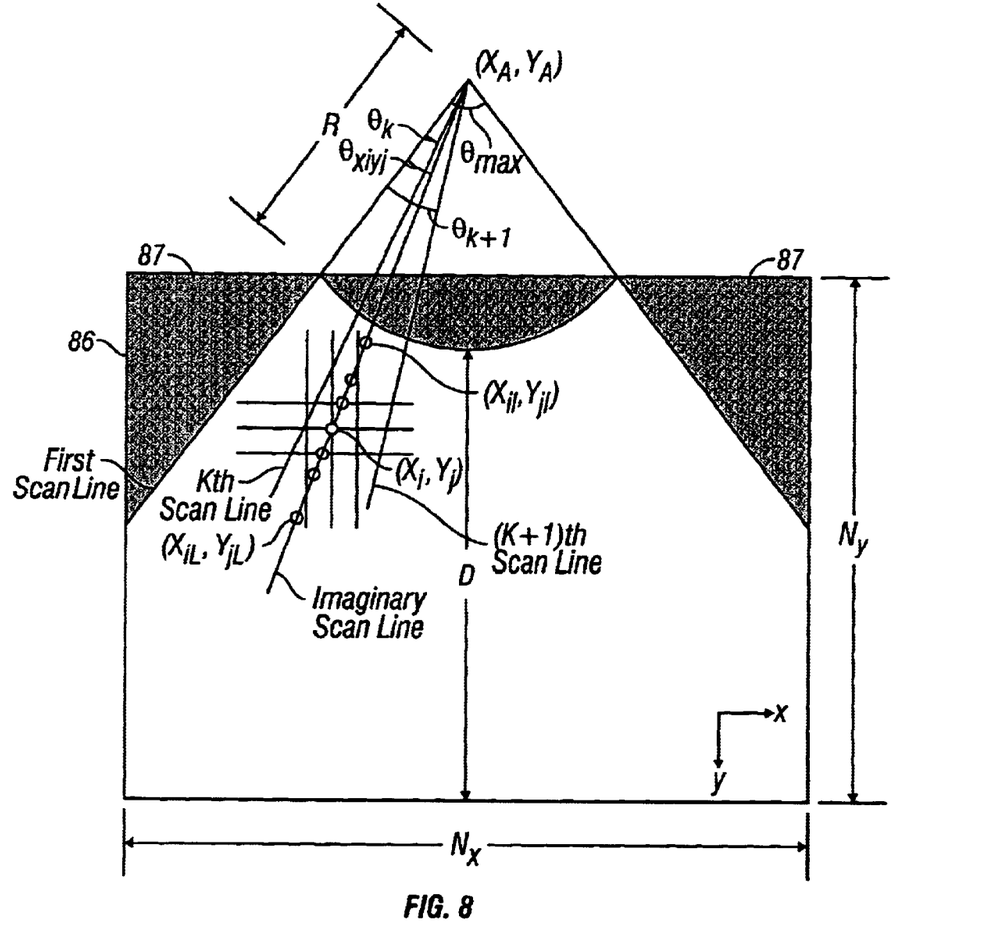
FIG. 8 illustrates determination of display data for a pixel using the data of an adjacent scan line.

FIG. 8 illustrates computing the display data for a pixel of a display screen by using an adjacent actual scan line to the pixel point, according to one embodiment of the present invention. Here, M channels/transducers out of a total of N channels are used for transmission/reception on a preselected scan line. Further, the radius or curvature of the curvilinear array of transducers is R(mm) with the scan angle and depth being $\theta_{max}$, and D(mm) respectively. RF data inputted from the array of transducers are all stored as follows. After transmit-focusing ultrasound on one of N scan lines that are radially spaced apart each by an angle $\Delta\theta$ with respect to the apex of the curve, reflected ultrasonic signal to each of M transducers is sampled at a predetermined frequency of $f_c$ and stored. The rectangular perimeter (86) of FIG. 8 represents the shape of a display screen where the ultrasonic image is ultimately to be displayed. The screen is shown to have Nx pixels in a row and Ny in a column such that it has a total of Nx×Ny pixels.

Figure 9:
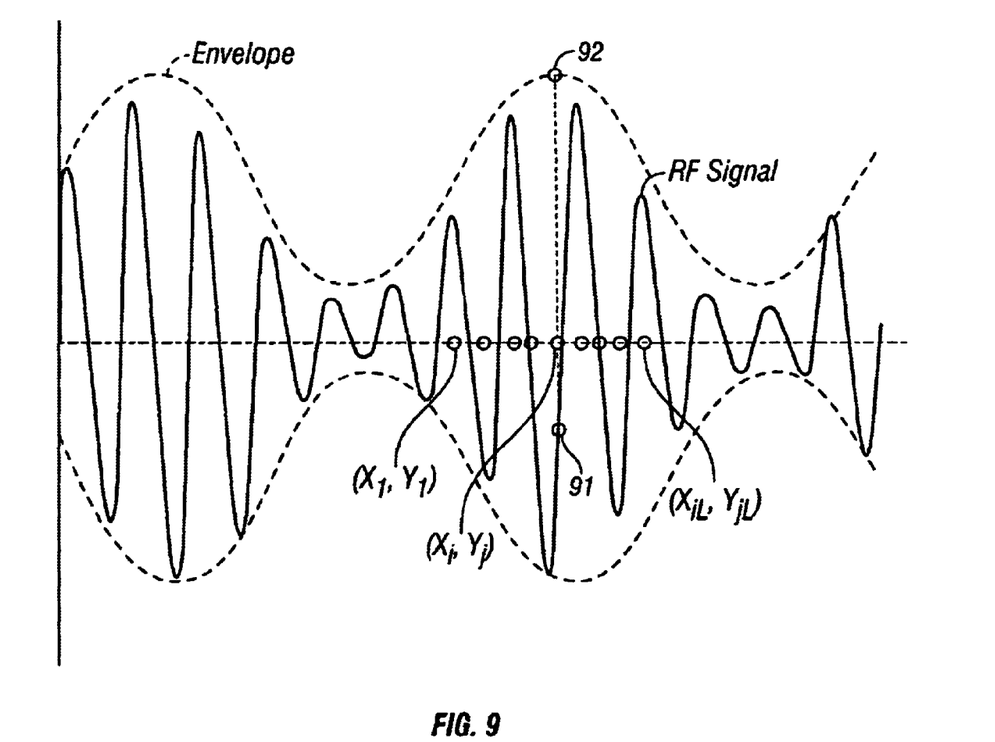
FIG. 9 illustrates comparison between received-focused RF signals and a value on the envelop.
Figure 10:
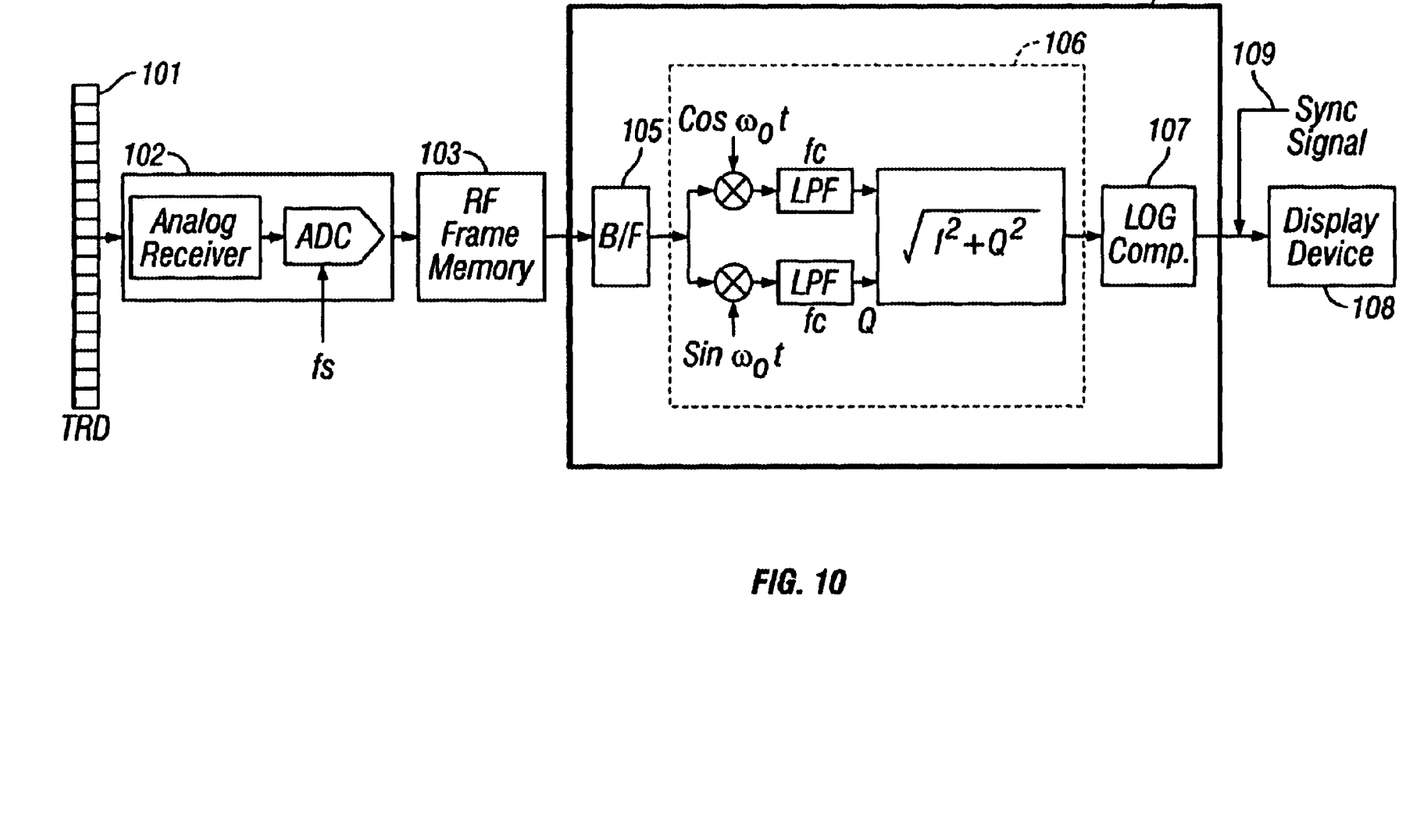
FIG. 10 is a block diagram of ultrasonic image system that receive-focuses on a pixel according to the present invention.

Described below is how direct receive focusing from a pixel point $(x_i, y_j)$ ($1 \leq i \leq Nx$, $1 \leq j \leq Ny$) is achieved by using the data of the most adjacent actual scan line. First, an actual scan line that is closest to an imaginary scan line extending from a selected pixel point to the apex and meets the following equation is identified.

$$\text{Minimize} |\theta_{x_i,y_j} - \theta_k|, 1 \leq k \leq N,$$

wherein $\theta_{x,y}$, is the angle between the imaginary scan line and the first actual scan line and $\theta_k$ is the angle between the kth actual scan line and the first actual scan line. Once an actual scan line that is closest to an imaginary scan line is found, the direct receive focusing from a pixel point $(x_i, y_j)$ is achieved by using RF data received after ultrasound was transmit-focused on the kth actual scan line. Receive-focused data about L points near the pixel point, including the pixel point itself, on the imaginary scan line are obtained in order to generate the display data of the pixel point. Data about a plurality of points around a selected pixel are needed because the receive-focused data of a pixel point $(x_i, y_j)$ will not be used directly but a corresponding envelope of a waveform formed from L points is used to determine display data for the pixel point. Specifically, ultrasonic signal information with respect to L points from a point $(x_{i1}, y_{j1})$ to a point $(x_{iL}, y_{jL})$ on the imaginary scan line are computed by receive focusing. A waveform represented by the information is determined as shown in FIG. 9. Though the actually detected signal at the pixel point of interest is represented by a small circle 91, the peak, represented by a circle 92, of the waveform is determined to be the effective data for the pixel. This process is repeated for all the other pixel points in order to display a whole image of the target object. FIG. 10 schematically shows an imaging system according to the present invention. Received signals at the transducer array 101 are sampled at a predetermined frequency $f_s$ by an ADC (102), digitized and stored at a frame memory (103). Thus, RF data received by all the transducers get stored in the frame memory. Data needed to be stored in order to display a single image are obtained by repeating the steps of transmit-focusing on a scan line, receiving the RF signal at M transducers and sampling the RF signal for all N scan lines. The size of memory required for storing data of one frame for a scan depth D, thus, is as follows.

$$N \cdot M \cdot \frac{2D}{v} \cdot f_a$$

A signal processing module (104) that generates display data of each pixel is composed of a beam former (B/F, 105), an envelop detector (106) and a log compensator (107). The beam former, using the data stored in the frame memory, computes data that was dynamically receive focused at points along the imaginary scan line including a pixel point $(x_i, y_j)$ and the apex $(x_A, y_A)$ and provides the data to the envelope detector.

An embodiment shown in FIG. 10 illustrates the use of a quadrature demodulator for envelop detection. The present invention, however, is not limited to the quadrature demodulation but any suitable envelop detection methods can be used.

Ultrasound does not attenuate uniformly across at all the frequencies when it propagate in a material. Higher frequency ultrasound attenuates much faster than lower frequency ultrasound. High frequency ultrasound decreases as it travels farther. Therefore, the output signal from the beam former preferably should pass a dynamic hand pass filter, whose pass band varies depending on the traveled distance of a received ultrasonic signal. In FIG. 10, by changing the frequency $\omega_0$ of a sine or cosine signal that is multiplied to the output of the beam former and the cut-off frequency $f_o$ of low pass filter, dynamic band passing can be performed in the envelop detector (106). Alternatively a separate dynamic band pass filter may be used.

The output of the envelop detector is provided to a display device (108) via a log compensator (107). The log compensator compensates differences in dynamic ranges of the envelop detector and the display device. As explained above, the receive focusing at a pixel point is repeated for all the other pixel points to form a whole image that fits a screen.

The RF frame memory (103) is comprised of a plurality of memory devices that can store image frames in order to display images in real time. Specifically, while data stored in one frame memory is used to display an image, another frame memory should be able to store RF data for the next frame.

Figure 11:
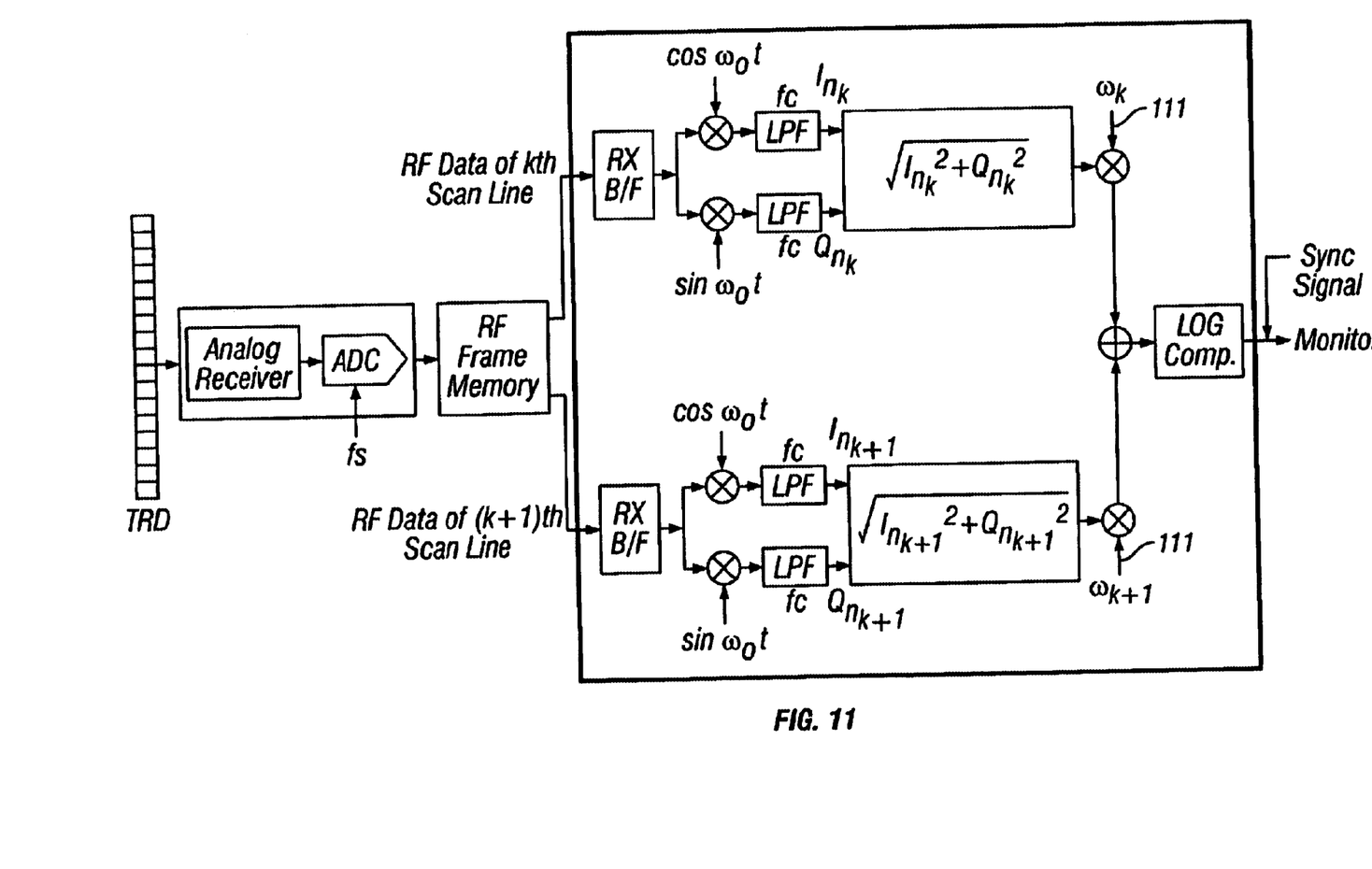
FIG. 11 is a block diagram of ultrasonic image system that utilizes two adjacent scan lines for determining data for a pixel.

Although a single actual scan line closest to a selected pixel point was used in the aforementioned embodiment, the present invention is not limited to that embodiment. For example the kth scan line and (k+1)th located on either side of a pixel point respectively may be used. FIG. 11 is a block diagram for such an embodiment utilizing two adjacent actual scan lines. The embodiment includes a circuit that processed RF data stored in the memory about the kth actual scan line and another circuit that processes RF data also stored in the memory about the (k+1)th scan line, and adding the weighted outputs of respective envelop detectors. This embodiment also preferably performs the dynamic band pass filtering. The weights $w_k$, $w_{k-1}$ multiplied to the envelop detector outputs, as shown in FIG. 11, are obtained as follows.

$$w_m = \frac{d\theta_{k+1}}{\theta_{k+1} - \theta_k}, d\theta_{n+1} - \theta_{k+1} - \theta_{xyi}$$

$$w_{k+1} = \frac{d\theta_k}{\theta_{k+1} - \theta_k}, d\theta_k - \theta_{xyi} - \theta_m$$

wherein $\theta_k$ and $\theta_{k+1}$ represent the angle between the first scan line and the kth, and the angle between the first scan line and the (k+1) scan line respectively. Just like the embodiment illustrated in FIG. 10 the RF frame memory is comprised of a plurality of memory devices that can store image frames in order to display images in real time.

Figure 12:
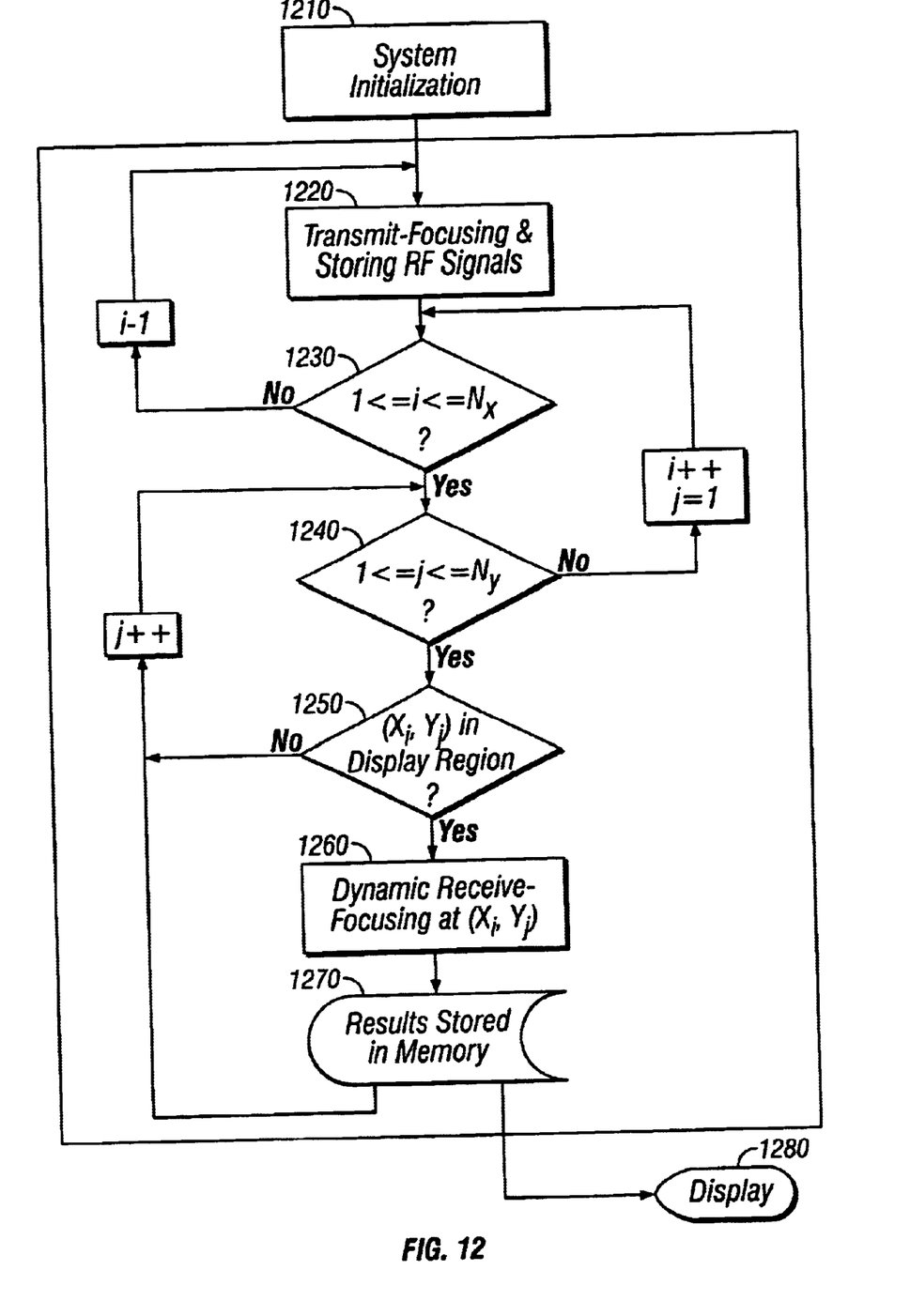
FIG. 12 is a flow chart for dynamic receive focusing according to the present invention.

FIG. 12 is a flow chart that explains a receive focusing method in accordance with the present invention. At step (1210) the ultrasonic image system is initialized to set system parameters such as the scan depth and the number of total scan lines. Additionally, in order to receive focus in accordance with the present invention, are set the number of pixels in X and Y directions of a display device, the number of points along an imaginary scan line and the number of adjacent actual scan lines that will used to obtain a pixel data.

At step (1220), after transmit focusing on each of scan lines, RF signals received at Nc transducers are stored in the RF frame memory. The RF memory, as mentioned shove, is comprised of a plurality of memory segments, each of which can store data for a single image frame, such that, while step 1230 is performed using data stored in one frame memory segment, RF data for the next image frame can be stored in another memory segment.

At step (1230), if variable i is determined to be between 1 and Nx, the next step 1240 is taken. Otherwise, i is set to 1 and step 1220 is repeated to store RF signals for the next image, since all the pixel data needed for the first image have been obtained.

At step 1240, if variable j is determined to be between 1 and Ny, the next step 1250 is taken. Otherwise, data for all the pixels for a Y-direction line have been obtained. Accordingly j is set to 1 and i is incremented by one and step 1230 is repeated for the next line.

At step 1250, it is checked whether a pixel point $(x_i, y_j)$ is located in the display region of the imaging system. As shown in FIG. 8, in the rectangular screen of a display device there exist areas 87 that are not covered by the ultrasonic image system because of the radial scan line direction. If the current pixel to be processed is in one of these non-image areas, then j is incremented by one and step 1240 is repeated for the next pixel point. Otherwise, at step 1260 a display data is obtained by receive focusing at the pixel $(x_i, y_j)$ using the RF data of Ns actual scan lines that are near to the pixel $(x_i, y_j)$.

Display data acquired at step 1260 is stored in the display memory at step 1270. After storage, j is incremented by one and step 1240 is repeated for obtaining and storing data for the next pixel point. The data in the display memory is used at step 1280 for display.

Figure 13:
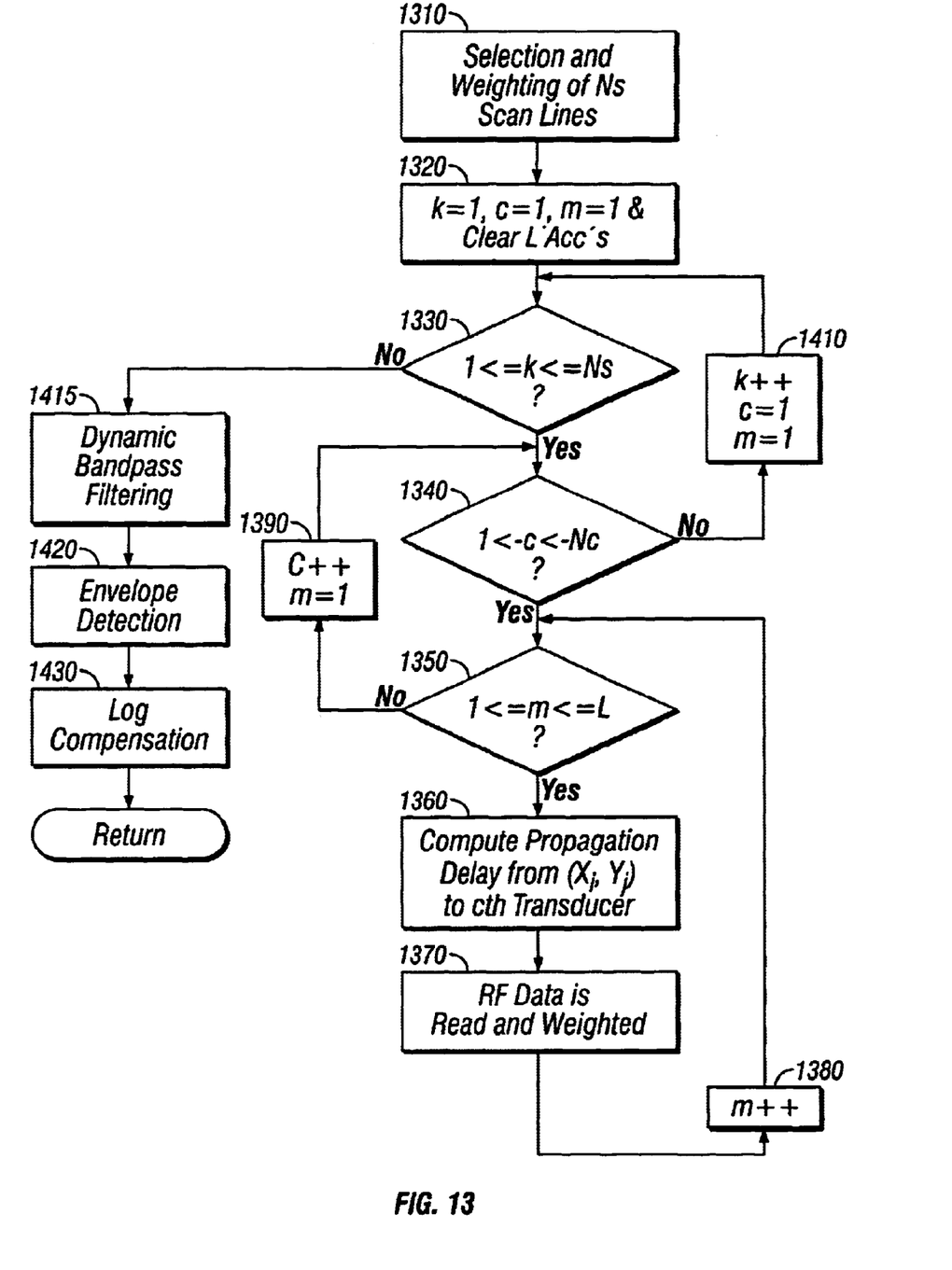
FIG. 13 is a flow chart for steps performed in step 1260 of FIG. 12.

FIG. 13 is a flow chart for explaining operations at step 12, relating to obtaining receive-focused data at a pixel $(x_i, y_j)$ using RF data of Ns adjacent actual scan lines. At step 1310, Ns scan lines near the pixel $(x_i, y_j)$ are selected and a weighting factor for each scan line is determined. The weighting factors are set inversely proportional to the distance between an imaginary scan line and an actual scan line.

At step 1320, variable k, c and m are all set to 1 and an array of L accumulators (Acc[m]) are cleared. The variable k is used to identify Ns actual scan lines near to the pixel point $(x_i, y_j)$. The variable c is used to identify Nc transducers that transmit-focus ultrasonic signals to an actual scan line and receive reflected signals. The variable m is used to indicate each of L receive-focused points on a imaginary scan line including the pixel for envelope detection. The flow chart of FIG. 13 shows three loops. The first and innermost loop includes steps 1350–1380. The second loop is comprised of steps 1340–1390, including the first loop. The third and outermost loop is comprised of steps 1330–1410, including the second loop. While the third loop iterates one time, the second loop iterates Nc times. In the meantime, the third loop iterates Ns times.

The first loop determines a portion of receive-focused data, at L points on an imaginary scan line, attributable to RF data received by a cth transducer among Nc transducers after the kth actual scan line is transmit focused. In order to elaborate on the first loop of FIG. 13, steps for obtaining receive-focused data at L points, $(x_{i1}, y_{j1})$–$(X_{iL}, y_{jL})$, on an imaginary scan line including the pixel $(x_i, y_j)$, will be described. In case that the variable m is equal to 1, propagation delay of an ultrasonic signal reflected from a point $(x_{i1}, y_{j1})$ to cth transducer is calculated using the formula described in connection with FIG. 8. At step 1370, using the calculated propagation delay, RF data received at the cth transducer is read and the result is multiplied by a weighting factor for the kth actual scan line and accumulated Acc[1]. At step 1380, m is incremented by one and the first loop, starting with step 1350, is repeated. Since m is now 2, the above steps are repeated for a point $(x_{i2}, y_{j2})$ and the computed value is accumulated to Acc[2]. By iterating the first loop L times, weighted results for all L points, as seen by the cth transducer, on the imaginary scan line are accumulated in the accumulator. At step 1390, by incrementing c by one and setting m block to 1 and iterating the first loop for another L times, receive-focused data for L points, as seen by the next transducer, are calculated and stored. By repeating the second loop Nc times, contributions by RF data received at Nc transducers to each of the L receive-focused data on L points are determined. Finally, by repeating the third and outermost loop Ns times, final data receive-focused at L points are computed using data of Ns actual scan lines.

By the time iterations in all the loops are over, L accumulators will have stored receive-focused data at L points on an imaginary scan line including the pixel point $(x_i, y_j)$. At step 1415, the data in the accumulators are bandpass filtered. At step 1420 the envelop is detected from the bandpass filtered data. At step 1430 log compensation is provided. As explained in reference to FIG. 10, the envelop detection step may include the function of the dynamic bandpass filtering.

As mentioned above, a preferred embodiment of an ultrasonic image system was described but the present invention is not limited to that particular embodiment. Modifications may be made to the embodiment. For instance, the preferred embodiment showed transmit focusing on radially patterned scan lines. But the present invention is not limited to such a scan line pattern. Parallel scan lines in the case of linear array of transducers are commonly used in transmit-focus ultrasonic image system. Even in this situation pixel points may not located on the scan lines. The present invention may be used in this type of ultrasonic image system and the quality of images will be improved by directly receive focusing on pixel points.

Figure 14:
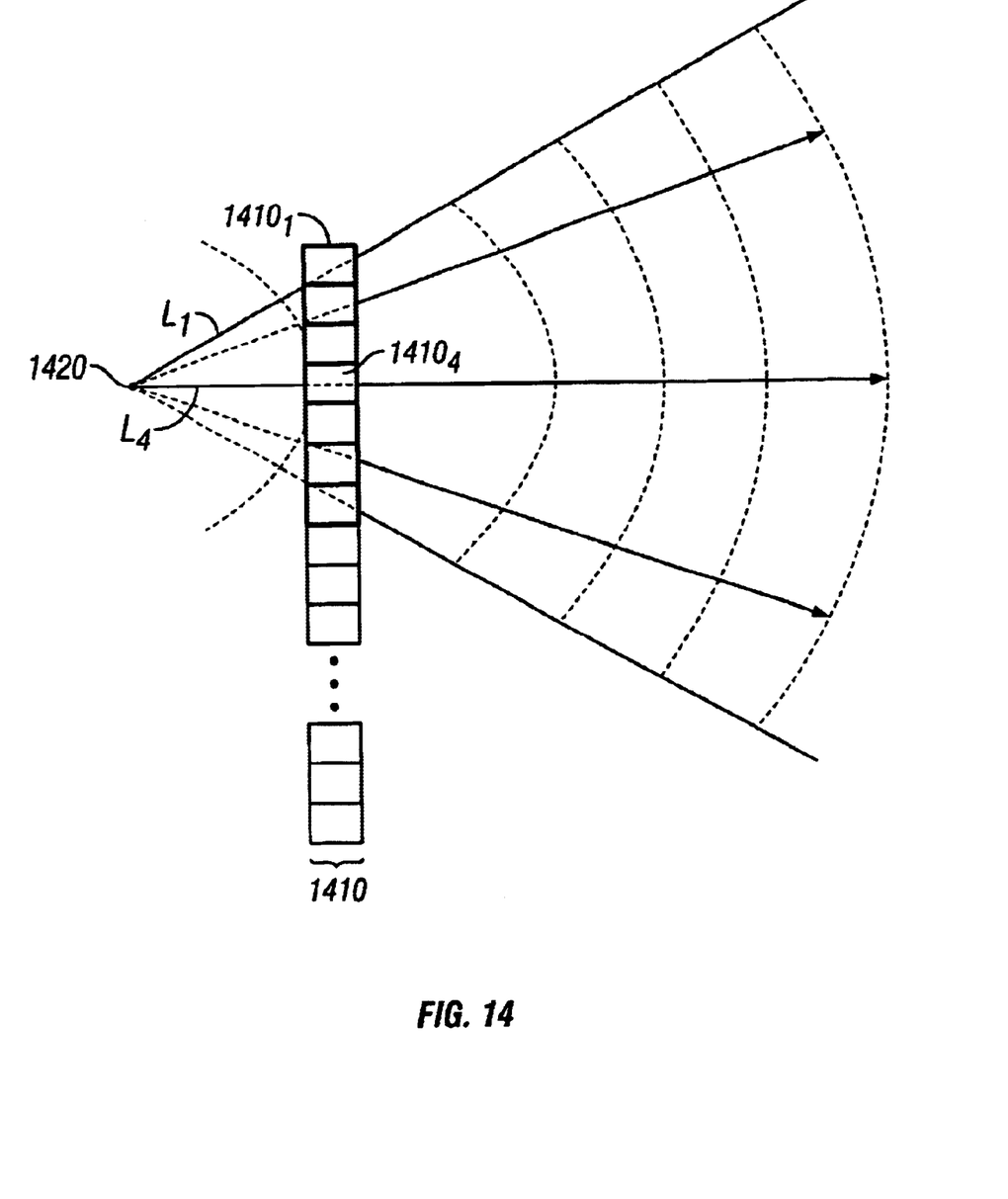
FIG. 14 illustrates propagation delays applied to transducers for de-focusing transmitted ultrasonic signals.

Additionally, in a preferred embodiment, a transmitted ultrasonic signal is focused on a single point on each scan line. However, the present invention may be used in a case that the signal is not focused on a single point, i.e., in case that a transmitted ultrasonic signal is de-focused. FIG. 14 illustrates time delays applied to transducers in order to de-focus ultrasonic signal. As shown in the figure, de-focused ultrasonic signal propagates radially as if it was generated form an imaginary point 1420 behind the transducer array 1410. If each of the transducers is activated to generate a same ultrasonic signal at the time an ultrasonic signal would have arrived thereto from the imaginary point 1420, the transmitted ultrasonic signals would appear to have been all generated from the imaginary point and propagate in the radial direction. As a result a transducer closest to the imaginary point would generate the ultrasonic signal before others do. The farther a transducer is away from the imaginary point, the later it starts to transmit the ultrasonic signal. For example, a transducer 1410, transmits after a transducer 1410$_4$ with a predetermined delay. The delay is expressed as follows.

$$\text{Delay} = L_1 - L_4/v,$$

where $L_1$ and $L_4$ are the distances between each of the transducers 1410$_1$, 1410$_4$ and the imaginary point, respectively, and v is the velocity of the ultrasonic signal.

After ultrasonic signal is transmitted so as to be de-focused, signals received at the transducers are stored. The propagation delay for the reflected signal from the pixel point to each transducer is computed. By adding the received signals by taking into account the delays, the ultrasonic signal's value focused at the pixel is obtained.

When ultrasonic signals are transmitted to be focused at a point on a scan line, the image of pixels distant from the focal point deteriorate. But, as mentioned above, if transmitted ultrasonic signals are de-focused the fluctuation of image quality depending on pixel location is prevented.

What is claimed is:

1. An ultrasound imaging system, comprising:

a display device;

ultrasound transducers for transmitting ultrasound signals toward a target object;

a storage means for storing signals received at the ultrasound transducers in response to the transmitted ultrasound signals; and a processing means for determining a receive-focused signal that is receive-focused at a selected point of the target object, the selected point corresponding to a certain pixel in the display device, wherein the ultrasound transducers transmit-focus ultrasound signals at a point on each of a plurality of scan lines, and the processing means determines characteristics of the reflected ultrasound signals received by each of the ultrasound transducers from multiple points on an imaginary scan line in response to the ultrasound signals transmitted on at least two of the plurality of scan lines, wherein the imaginary scan line includes the selected point and is between the at least two scan lines for computing display data for the selected point, and wherein the characteristics of the reflected ultrasound signals from the multiple points are weighted according to on which one of the at least two scan lines the ultrasound signals were transmit-focused.

2. An ultrasound imaging system, comprising:

an array of transducers for transmitting ultrasound signals toward a target object to scan the target object along a plurality of scan lines extending radially from the array and receiving echo signals reflected from the target object wherein two of the scan lines define at least one imaginary scan line extending radially from the array between the two scan lines;

a first processing means for receive-focusing the received echo signals at a plurality of points on each of the scan lines; and a second processing means for generating echo data associated with a plurality of points on each of the imaginary scan lines based on the receive-focused echo signals, wherein the echo data has a plurality of peaks and the plurality of peaks define an envelope of the echo data, and for calculating a peak value of the envelop at a desired point of the plurality of points on each imaginary scan line.

3. The system as claimed in claim 2, wherein the second processing means further comprises:

means for determining a scan line among the scan lines closest to the desired point corresponding to a certain pixel of an image for the target object, by taking into account a time delay relationship between the plurality of points on each scan line and the plurality of points on each imaginary scan line, for the receive-focused echo signals; and means for compensating the peak value of the envelope calculated from echo data generated based on the receive-focused echo signals at the plurality of points on the closest scan line, to thereby generate pixel data for the certain pixel.

4. The system as claimed in claim 2, wherein the second processing means further comprises:

means for determining two scan lines among the scan lines adjacent to the desired point corresponding to a certain pixel of an image for the target object, by taking into account a time delay relationship between the plurality of points on each scan line and the plurality of points on each imaginary scan line, for the receive-focused echo signals;

means for multiplying a weight to peak values calculated from echo data generated based on the receive-focused echo signals at the plurality of points on each of the two adjacent scan lines; and means for adding the weighted peak values to each other; and means for compensating the added result, to thereby generate pixel data for the certian pixel.

5. The system as claimed in claim 2, wherein the ultrasound signals transmitted from the array toward the target object are one of ultrasound signals transmit-focused to the plurality of points on each scan line and defocused ultrasound signals.

6. A method for imaging a target object, comprising the steps of:

a) transmitting ultrasound signals toward a target object to scan the target object along a plurality of scan lines extending radially from the array and receiving echo signals reflected from the target object wherein two of the scan lines define at least one imaginary scan line extending radially from the array between the two scan lines;

b) receive-focusing the received echo signals at a plurality of points on each scan line;

c) determining a scan line among the scan lines closest to a desired point corresponding to a certain pixel of an image for the target object, by taking into account a time delay relationship between the plurality of points on each scan line and a plurality of points on each imaginary scan line, for the receive-focused echo signals;

d) generating echo data associated with the plurality of points on each imaginary scan line that includes the desired point, based on the receive-focused echo signals at the plurality of points on the closest scan line, wherein the data has a plurality of peaks and the plurality of peaks define an envelope of the echo data;

e) calculating a peak value of the envelope at the desired point on the imaginary scan line;

f) compensating the calculated peak value to generate pixel data for the certain pixel; and g) repeating the steps c) to f) for the remaining pixels of the image.

7. A method for imaging a target object, comprising the steps of:

a) transmitting ultrasound signals toward a target object to scan the target object along a plurality of scan lines extending radially from the array and receiving echo signals reflected from the target object wherein two of the scan lines define at least one imaginary scan line extending radially from the array between the two scan lines;

b) receive-focusing the received echo signals at a plurality of points on each scan line;

c) determined two scan lines among the scan lines adjacent to a desired point corresponding to a certain pixel of an image for the target object, by taking into account a time delay relationship between the plurality of points on each scan line and a plurality of points on each imaginary scan line, for the receive-focused echo signals;

d) generating echo data associated with the plurality of points on each imaginary scan line that includes the desired point, based on the receive-focused echo signals at the plurality of points on each of the two adjacent scan lines, wherein the data has a plurality of peaks and the plurality of peaks define an envelope of the echo data;

e) calculating peak values at the desired point on the imaginary scan line, wherein the peak values are calculated from echo data generated based on the receive-focused echo signals at the plurality of points on each of the two adjacent scan lines;

f) multiplying a weight to each of the peak values;

g) adding the weighted values to produce an added value;

h) compensating the added value, to thereby generate pixel data for the certain pixel; and i) repeating the steps c) to h) for the remaining pixels of the image.

* * * * *

UNITED STATES PATENT AND TRADEMARK OFFICE
CERTIFICATE OF CORRECTION

PATENT NO.   : 6,648,824 B2
DATED        : November 18, 2003
INVENTOR(S)  : Jae Sub Hwang and Tai Kyong Song It is certified that error appears in the above-identified patent and that said Letters Patent is hereby corrected as shown below:

Column 1,
Line 22, replace "allows" with -- shows --.
Line 22, replace "or" with -- of --.

Column 2,
Line 12, replace "because" with -- become --.
Lines 40, 46 and 51, replace "mth" with -- $m$th --.

Column 3,
Line 50, replace "date" with -- data --.

Column 4,
Lines 6 and 19, replace "mth" with -- $m$th --.

Column 5,
Line 45, replace "hand" with -- band --.

Column 6,
Lines 10-15, replace equation "
$$w_m = \frac{d\theta_{k+1}}{\theta_{k+1} - \theta_k} \cdot d\theta_{m+1} - \theta_{k+1} - \theta_{xyi}$$
$$w_{k+1} = \frac{d\theta_k}{\theta_{k+1} - \theta_k} \cdot d\theta_k - \theta_{xyi} - \theta_m$$
"
with --
$$w_k = \frac{d\theta_{k+1}}{\theta_{k+1} - \theta_k} \cdot d\theta_{k+1} - \theta_{k+1} - \theta_{xyi}$$
$$w_{k+1} = \frac{d\theta_k}{\theta_{k+1} - \theta_k} \cdot d\theta_k - \theta_{xyi} - \theta_k$$
--.

UNITED STATES PATENT AND TRADEMARK OFFICE
CERTIFICATE OF CORRECTION

PATENT NO. : 6,648,824 B2
DATED : November 18, 2003
INVENTOR(S) : Jae Sub Hwang and Tai Kyong Song It is certified that error appears in the above-identified patent and that said Letters Patent is hereby corrected as shown below:

Column 7,
Lines 22 and 29, replace "cth" with -- $c$th --.
Line 23, replace "kth" with -- $k$th --.
Line 25, replace "$x_{iL}$," with -- $x_{iL}$ --.

Line 31, replace "cth" wth -- $cth$ --.

Signed and Sealed this

Ninth Day of November, 2004

JON W. DUDAS
*Director of the United States Patent and Trademark Office*